C. W. DE MOOY.
HIGH FREQUENCY GENERATOR OF THE TRANSFORMER TYPE.
APPLICATION FILED AUG. 20, 1917.
1,376,081.  Patented Apr. 26, 1921.
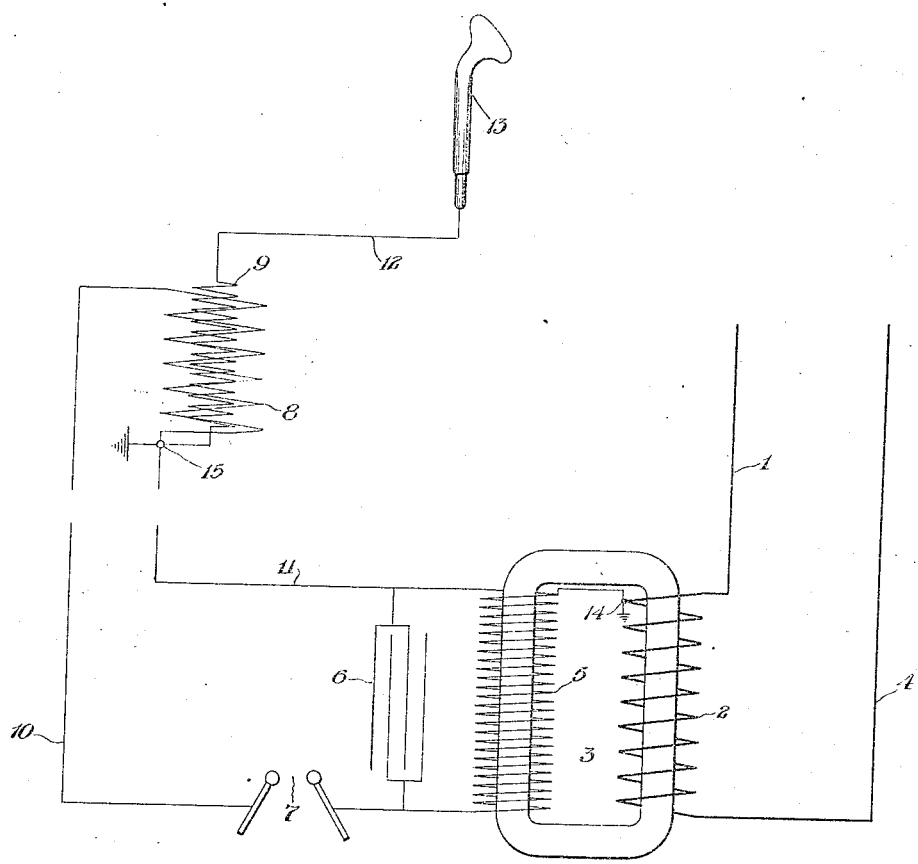
Inventor
Charles W. DeMooy
by his atty.

UNITED STATES PATENT OFFICE.

CHARLES W. DE MOOY, OF CLEVELAND, OHIO, ASSIGNOR TO THE DE MOOY ELECTRIC CO., OF CLEVELAND, OHIO.

HIGH-FREQUENCY GENERATOR OF THE TRANSFORMER TYPE.

1,376,081.   Specification of Letters Patent.   Patented Apr. 26, 1921.

Application filed August 20, 1917. Serial No. 187,273.

*To all whom it may concern:*

Be it known that I, CHARLES W. DE MOOY, a citizen of the United States, residing at 1831 E. 55th St., city of Cleveland, in the county of Cuyahoga and State of Ohio, have invented a new and useful Improvement in High-Frequency Generators of the Transformer Type, of which the following is a specification, the principle of the invention being herein explained and the best mode in which I have contemplated applying that principle, so as to distinguish it from other inventions.

This invention pertains to high frequency generator of the transformer type using an alternating current and in consequence making unnecessary the use of a vibrator to obtain an impulsive current.

My knowledge of the art leads me to believe that two features of my machine may be new. Accordingly I have had two objects in mind:

(1) To place the induction coil, in the electrical combination claimed, right at the dielectric at the end of the extension cord so as to avoid the shocking inconvenience of the old hot wire through which regardless of the commercially feasible insulation of the cord, high frequency was wont to be discharged.

(2) To ground one end of both of a pair of primary and secondary windings so as to avoid jumping across, hence leakage and eventual puncturing of certain insulations.

The drawing illustrates the essential parts of the electrical system diagrammatically.

The lead wire 1 allows the current to flow through the primary coil 2 of a transformer 3 and thence back along the lead wire 4. This induces a current in the secondary coil 5 and the current is stepped up in the condenser 6 until it finally jumps across the spark gap 7 whence it travels to and from the induction coil composed of the primary and secondary windings 8 and 9 respectively along the cord wires 10 and 11 to emerge along the wire 12 and become discharged from the dielectric 13. The coils 2 and 5 are grounded at 14. Similarly the coils 8 and 9 are grounded at 15.

It should be understood that the wires 10 and 11 are contained in that flexible cord which is to be manipulated during therapeutical application of the violet rays. Manifestly therefore, if the induction coil and dielectric are both at the end of the cord the possibility of discharge therethrough is avoided. I believe such an arrangement to be novel in the type of outfit stated. Simple as it is, it certainly adds not only to the protection of the user, but to the durability of the cord.

The ground connections 14 and 15 conserve current and prolong the effective life of the whole.

I claim:

A high frequency machine of the transformer type for alternating current usage, comprising in electrical circuit; a transformer having grounded primary and secondary windings, a condenser, an induction coil also having grounded primary and secondary windings, and a flexible insulated cord connecting said induction coil with the other parts for the purpose specified.

Signed by me, this 17 day of August, 1917.

CHARLES W. DE MOOY.